United States Patent
Martin et al.

(10) Patent No.: US 8,816,637 B2
(45) Date of Patent: *__Aug. 26, 2014__

(54) VEHICLE GUIDANCE SYSTEM WITH INTERFACE

(75) Inventors: Douglas Raymond Martin, Canton, MI (US); Kenneth James Miller, Canton, MI (US); William David Treharne, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/267,038

(22) Filed: Oct. 6, 2011

(65) Prior Publication Data

US 2012/0091959 A1   Apr. 19, 2012

(51) Int. Cl.
*H02J 7/00* (2006.01)
*B60L 11/18* (2006.01)

(52) U.S. Cl.
CPC ......... *B60L 11/1833* (2013.01); *B60L 11/1829* (2013.01); *Y02T 90/14* (2013.01); *Y02T 90/122* (2013.01); *Y02T 10/7005* (2013.01); *Y02T 10/7088* (2013.01); *B60L 2250/16* (2013.01); *B60L 2230/22* (2013.01); *Y02T 90/16* (2013.01); *Y02T 90/125* (2013.01); *Y02T 90/12* (2013.01)
USPC ........................................................ 320/109

(58) Field of Classification Search
CPC ....................................................... Y02T 90/14
USPC ........................................................ 320/109
See application file for complete search history.

(56) References Cited

U.S. PATENT DOCUMENTS

| 4,910,718 | A | | 3/1990 | Horn |
|---|---|---|---|---|
| 5,049,802 | A | | 9/1991 | Mintus et al. |
| 5,563,491 | A | | 10/1996 | Tseng |
| 5,617,003 | A | | 4/1997 | Odachi et al. |
| 5,821,731 | A | * | 10/1998 | Kuki et al. ................ 320/108 |
| 6,959,282 | B2 | * | 10/2005 | Kakihara et al. ............. 705/13 |
| 7,903,842 | B2 | * | 3/2011 | Satonaka ................... 382/104 |

(Continued)

FOREIGN PATENT DOCUMENTS

| DE | 3116586 A1 | 3/1984 |
|---|---|---|
| DE | 102008046215 A1 | 9/2009 |

(Continued)

OTHER PUBLICATIONS

Ovidiu, Evatran's Wireless EV Charger: Lower Efficiency for Sake of Comfort?, http://www.greenoptimistic.com/2009/12/22/evatrans-wireless-ev-charger-lower-efficiency-for-sake-of-comfort/, Dec. 22, 2009.
Haloipt, Wireless charging for electric vehicles, http://www.youtube.com/watch?v=RnePffoZs_k, Dec. 6, 2009.

*Primary Examiner* — Yalkew Fantu
(74) *Attorney, Agent, or Firm* — David B. Kelley; Brooks Kushman P.C.

(57) ABSTRACT

A vehicle guidance system is provided with a controller configured to receive input signals indicative of an instantaneous charging port position relative to an external charging pad and a charging status. The controller is further configured to transmit a vehicle status signal in response to the input signals. An interface communicates with the controller, and is configured to display a vehicle position indicator and a charging status message in response to the vehicle status signal.

17 Claims, 6 Drawing Sheets

(56) References Cited

U.S. PATENT DOCUMENTS

| | | |
|---|---|---|
| 2007/0131505 A1 | 6/2007 | Kim |
| 2010/0117596 A1* | 5/2010 | Cook et al. .................... 320/108 |
| 2010/0161216 A1 | 6/2010 | Yamamoto |
| 2010/0161217 A1 | 6/2010 | Yamamoto |
| 2010/0201204 A1* | 8/2010 | Sakoda et al. ................ 307/104 |
| 2010/0201309 A1 | 8/2010 | Meek |
| 2010/0235006 A1* | 9/2010 | Brown .......................... 700/286 |
| 2011/0148350 A1* | 6/2011 | Wegener et al. ............. 320/108 |
| 2011/0175569 A1* | 7/2011 | Austin .......................... 320/109 |
| 2011/0254503 A1 | 10/2011 | Widmer et al. |

FOREIGN PATENT DOCUMENTS

| | | |
|---|---|---|
| GB | 2105464 A | 3/1983 |
| JP | 2010268664 A | 11/2010 |
| WO | 2006133074 A2 | 12/2006 |
| WO | 2010006078 A1 | 1/2010 |
| WO | 2010022059 A1 | 2/2010 |
| WO | 2010098397 A1 | 9/2010 |

\* cited by examiner

VEHICLE GUIDANCE SYSTEM WITH INTERFACE

TECHNICAL FIELD

One or more embodiments relate to a vehicle guidance system having an interface that conveys vehicle position information relative to an external power supply for facilitating vehicle battery charging.

BACKGROUND

Battery electric vehicles (BEVs) and plug-in hybrid electric vehicles (PHEVs) may be connected to an external power supply for charging a vehicle battery. Such vehicles typically include a charge cord that extends from an external power supply and is physically connected to a vehicle charging port to facilitate charging of the vehicle battery. However, such charge cords are prone to operator error. For example, if the user fails to properly connect the charge cord, or forgets to connect the charge cord altogether, then the battery will not be charged. Further the user may damage the charge cord or the vehicle if he or she forgets to disconnect the charge cord before driving away from the external power supply. Additionally, the charge cord must be stored in a secure location when not in use. For example, the charge cord may be damaged if the user leaves the charge cord on the ground and inadvertently drives over it.

Vehicles include a number of interfaces, such as gauges, indicators, and displays to convey information to the user regarding the vehicle and its surroundings. With the advent of new technologies, these user interfaces have become more sophisticated. For example, some vehicles include external cameras and an interface for displaying the image taken by the camera while the vehicle is backing up or parallel parking. Also, many hybrid electric vehicles (HEVs) incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

SUMMARY

In one embodiment a vehicle guidance system is provided with a controller configured to receive input signals indicative of an instantaneous charging port position relative to an external charging pad. The controller is further configured to transmit a vehicle status signal in response to the input signals. An interface communicates with the controller and is configured to display a vehicle position indicator with a target element indicative of a target charging port position in response to the vehicle status signal.

In another embodiment, a vehicle guidance system is provided with a controller configured to receive input signals indicative of an instantaneous vehicle position relative to an external charging pad and a charging status. The controller is further configured to transmit a vehicle status signal in response to the input signals. An interface communicates with the controller and is configured to display a vehicle position indicator and a charging status message in response to the vehicle status signal.

In yet another embodiment, a vehicle is provided with a charging port and a controller configured to receive input signals indicative of an instantaneous charging port position relative to an external charging pad and a charging status. The controller is further configured to transmit a vehicle status signal in response to the input signals. An interface communicates with the controller and is configured to display a vehicle position indicator and a charging status message in response to the vehicle status signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
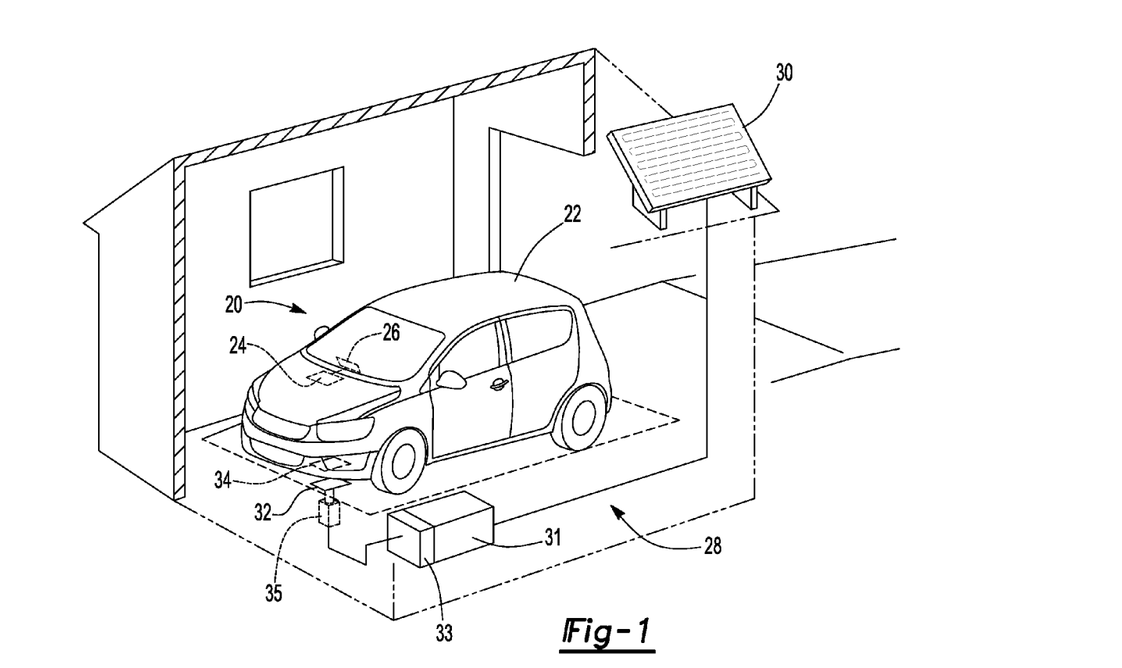
FIG. 1 is a schematic view of a vehicle guidance system according to one or more embodiments and illustrated located within a partially fragmented structure having an external power supply.

With reference to FIG. 1, a vehicle guidance system is illustrated in accordance with one or more embodiments and is generally referenced by numeral 20. The guidance system 20 is depicted within a vehicle 22. The guidance system 20 includes a guidance controller 24 and a user interface 26 that are in communication with each other. The controller 24 receives input signals and determines an instantaneous position of the vehicle 22 relative to an external power supply 28 and a charging status. The controller 24 transmits this information to the user interface 26, which in turn conveys the information to the driver. The driver uses this information as a guide to align the vehicle 22 to the external power supply 28.

The external power supply 28 includes a power source 30 and a charging pad 32. The external power source 30 may include a device for harnessing renewable resources, such as sunlight and wind power. In the illustrated embodiment, the power source 30 is a solar panel that converts solar power (sunlight) into direct current (DC) electrical power. Other embodiments of the power source 30 include a wind turbine (not shown) for converting wind power into electric power. An external battery 31 is disposed between the power source 30 and the charging pad 32 for storing the DC power. In one embodiment, the external battery 31 is a recycled high voltage battery from a HEV, PHEV or BEV. Additionally, an inverter 33 is connected between the external battery 31 and the charging pad 32 for converting the DC power to alternating current (AC). Alternatively the external power supply 28 may connect to the power grid (not shown), where the power source 30 represents an AC power source, or connection to the grid (not shown).

The vehicle 22 is configured for inductive charging. The vehicle 22 includes a charging port 34 that is mounted to an external bottom surface of the vehicle, according to one or more embodiments. The charging port 34 is aligned with the charging pad 32 for receiving electrical energy. Inductive charging does not require physical contact between the charging port 34 and charging pad 32, which limits some of the problems associated with charge cords and physical connections. However, the charging port 34 and charging pad 32 must be generally close in proximity to each other for efficient inductive charging. Since the charging port 34 is not visible from the driver's seat, it is difficult for the driver to align the charging port 34 to the charging pad 32 without a guide or some type of feedback.

The guidance system 20 conveys vehicle position information to the user so that the user can align the charging port 34 to the charging pad 32. At least one embodiment of the guidance system 20 is contemplated for a vehicle 22 having a park-assist feature whereby other vehicle systems align the charging port 34 to the charging pad 32 in response to vehicle position information provided by the guidance system 20. The charging pad 32 may be secured in a fixed position. Alternatively, the pad 32 may be coupled to an actuator 35 to move towards the charging port 34.

Figure 2:
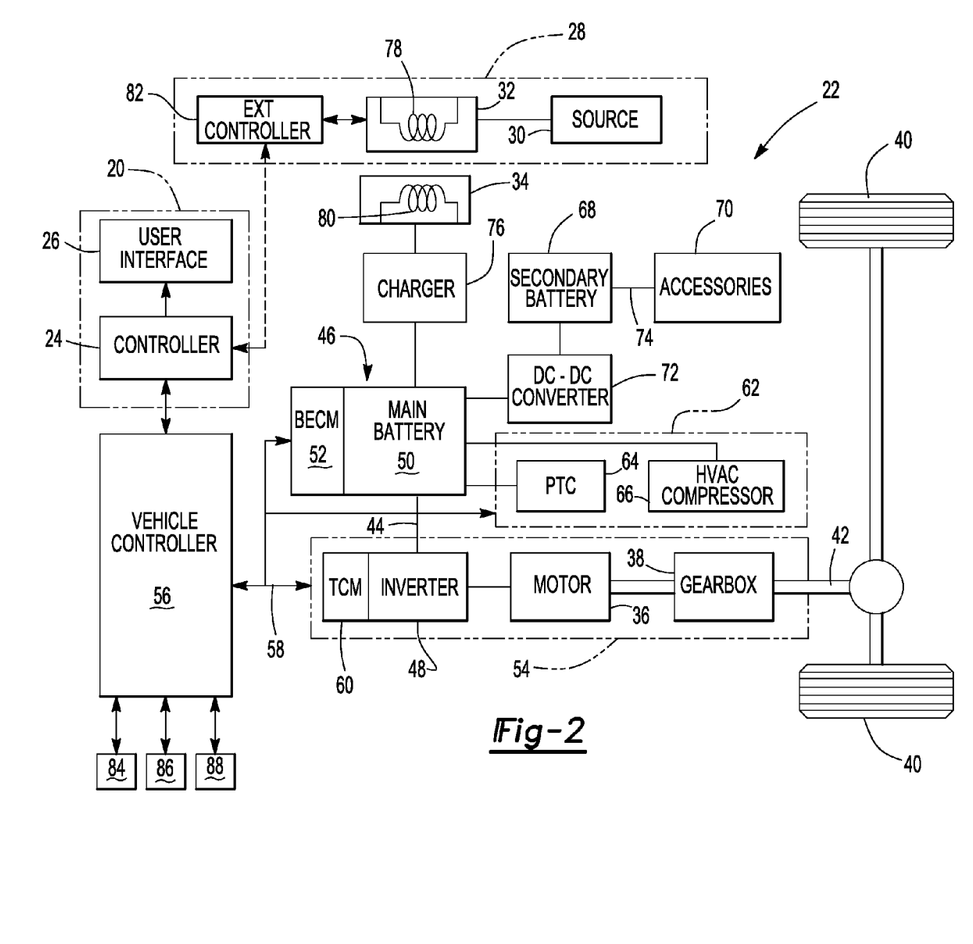
FIG. 2 is a schematic diagram further illustrating the vehicle guidance system of FIG. 1, and illustrated with the external power supply.

FIG. 2 is a schematic diagram further illustrating the vehicle guidance system 20 according to one or more embodiments. The illustrated embodiment depicts the vehicle 22 as a battery electric vehicle (BEV), which is an all-electric vehicle propelled by one or more electric motors 36 without assistance from an internal combustion engine (not shown). The motor 36 receives electrical power and provides mechanical rotational output power. The motor 36 is mechanically connected to a gearbox 38 for adjusting the output torque and speed of the motor 36 by a predetermined gear ratio. The gearbox 38 is connected to a set of drive wheels 40 by an output shaft 42. Other embodiments of the vehicle 22 include multiple motors (not shown) for propelling the vehicle 22. The motor 36 may also function as a generator for converting mechanical power into electrical power. A high voltage bus 44 electrically connects the motor 36 to an energy storage system 46 through an inverter 48. The high voltage bus 44 is illustrated as a solid line in FIG. 2.

The energy storage system 46 includes a main battery 50 and a battery energy control module (BECM) 52, according to one or more embodiments. The main battery 50 is a high voltage battery that is capable of outputting electrical power to operate the motor 36. According to one or more embodiments, the main battery 50 may be a battery pack made up of several battery modules. Each battery module may contain a plurality of battery cells. The battery cells may be air cooled using existing vehicle cabin air. The battery cells may also be heated or cooled using a fluid coolant system. The BECM 52 acts as a controller for the main battery 50. The BECM 52 may also include an electronic monitoring system that manages temperature and state of charge of each of the battery cells. Other embodiments of the vehicle 22 contemplate different types of energy storage systems, such as capacitors and fuel cells (not shown).

The motor 36, the gearbox 38, and the inverter 48 may collectively be referred to as a transmission 54. A vehicle controller 56 controls the components of the transmission 54, according to one embodiment. Although it is shown as a single controller, the vehicle controller 56 may include multiple controllers that may be used to control multiple vehicle systems. For example, the vehicle controller 56 may be a vehicle system controller/powertrain control module (VSC/PCM). In this regard, the PCM portion of the VSC/PCM may be software embedded within the VSC/PCM, or it can be a separate hardware device. The vehicle controller 56 and the controller 24, generally include any number of microprocessors, ASICs, ICs, memory (e.g., FLASH, ROM, RAM, EPROM and/or EEPROM) and software code to co-act with one another to perform a series of operations. The vehicle controller 56 communicates with other controllers (e.g., BECM 52) over a hardline vehicle connection 58 using a common bus protocol (e.g., CAN).

According to one or more embodiments, the transmission 54 includes a transmission control module (TCM) 60 configured to coordinate specific components within the transmission 54, such as the motor 36 and/or the inverter 48. The TCM 60 may communicate with the vehicle controller 56 over the CAN bus 58. The TCM 60 may include a motor controller for monitoring, among other things, the position, speed, power consumption and temperature of the motor 36. Using this information and a throttle command by the driver, the motor controller and the inverter 48 may convert the direct current (DC) voltage supply by the main battery 50 into signals that can be used to drive the motor 36. Some or all of these various controllers can make up a control system, which, for reference purposes, may be the vehicle controller 56. Although illustrated and described in the context of the vehicle 22, which is a BEV, it is understood that embodiments of the present application may be implemented on other types of vehicles, such as those powered by an internal combustion engine, either alone or in addition to one or more electric machines (e.g., HEVs, PHEVs, etc.).

In one or more embodiments, the vehicle 22 is configured for automatic propulsion control. For example, in one embodiment the vehicle 22 is configured as a BEV, and includes a park-assist feature whereby the TCM 60 controls the output torque of the motor 36 in response to the vehicle position information provided by the guidance system 20, for propelling the vehicle 22. In another embodiment the vehicle 22 is configured as an HEV, or PHEV, and includes a park-assist feature whereby the vehicle controller 56 controls the engine (not shown) to propel the vehicle 22 in response to the vehicle position information provided by the guidance system 20.

The vehicle 22 includes a climate control system 62 for heating and cooling various vehicle components. The climate control system 62 includes a high voltage positive temperature coefficient (PTC) electric heater 64 and a high voltage electric HVAC compressor 66, according to one or more embodiments. The PTC 64 may be used to heat coolant that circulates to a passenger car heater and to the main battery 50. Both the PTC 64 and the HVAC compressor 66 may draw electrical energy directly from the main battery 50. The climate control system 62 may include a controller (not shown) for communicating with the vehicle controller 56 over the CAN bus 58. The on/off status of the climate control system 62 is communicated to the vehicle controller 56, and can be based on, for example, the status of an operator actuated switch, or the automatic control of the climate control system 62 based on related functions such as window defrost.

The vehicle 22 includes a secondary battery 68, such as a typical 12-volt battery, according to one embodiment. The secondary battery 68 may be used to power the vehicle's various other accessories, headlights, and the like (collectively referred to herein as accessories 70). A DC-to-DC converter 72 may be electrically interposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70. The low voltage bus 74 is illustrated as a solid line in FIG. 2.

The vehicle 22 includes an AC charger 76 for charging the main battery 50. The AC charger 76 is connected to the charging port 34 for receiving AC power from the external power supply 28. The AC charger 76 includes power electronics used to convert, or "rectify" the AC power received from the external power supply 28 to DC power for charging the main battery 50. The AC charger 76 is configured to accommodate one or more conventional voltage sources from the external power supply 28 (e.g., 110 volt, 220 volt, etc.).

The charging port 34 is aligned with the charging pad 32 for receiving electrical power. The external power supply 28 includes a primary coil 78 that is disposed in the charging pad 32 and connected to the power source 30. The charging port 34 includes a secondary coil 80 which is connected to the AC charger 76. The power source 30 supplies the primary coil 78 with a current which establishes a magnetic field (not shown) about the primary coil 78. The secondary coil 80 may be electromagnetically coupled to the primary coil 78, by aligning the charging port 34 with the charging pad 32, and placing the secondary coil 80 within the magnetic field. This magnetic field induces a current in the secondary coil 80 for charging the main battery 50, which is referred to as inductive charging.

The external power supply 28 includes an external controller 82 for communicating with one or more controllers of the vehicle 22, according to one or more embodiments. The external controller 82 may communicate wirelessly, for example using radio-frequency (RF), infrared (IF) or sonar communication. For example, in one embodiment, the external controller 82 communicates with the controller 24 of the guidance system 20 using RF communication; and the controller 24 communicates with the vehicle controller 56 by a hardline electrical connection. In another embodiment, the charging port 34 includes a microcontroller 102 (shown in FIG. 5) for communicating with both the external controller 82 and the controller 24. Wireless communication is represented by dashed signal lines, in FIG. 2.

The external controller 82 communicates with the charging pad 32 for controlling the electrical power provided to the vehicle 22. In one embodiment, the external controller 82 communicates with switches (not shown, e.g., IGBTs) between the source 30 and the primary coil 78 to only allow current to flow if certain conditions are met. For example, the external controller 82 may prevent charging unless the vehicle controller 56 has requested charging, or unless the charging port 34 is within a predetermined distance from the charging pad 32.

Also shown in FIG. 2 are simplified schematic representations of a driver controls system 84, a power steering system 86, and a navigation system 88. The driver controls system 84 includes braking, acceleration and gear selection (shifting) systems (all not shown). The braking system may include a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system may include an accelerator pedal having one or more sensors, which, like the sensors in the braking system, may provide information such as throttle input to the vehicle controller 56. The gear selection system may include a shifter for manually selecting a gear setting of the gearbox 38. The gear selection system may include a shift position sensor for providing shifter selection information (e.g., PRNDL) to the vehicle controller 56.

In one or more embodiments, the power steering system 86 includes a steering actuator (not shown) for automatic steering control. The steering actuator is coupled to the drive wheels 40 for adjusting a steering angle (not shown) of each wheel 40 in response to an input signal. For example, the vehicle 22 may include a park-assist feature whereby the vehicle controller 56, or some other controller, controls the steering actuator to steer the vehicle 22 in response to the vehicle position information provided by the guidance system 20.

The navigation system 88 may include a navigation display, a global positioning system (GPS) unit, a navigation controller and inputs (all not shown) for receiving destination information or other data from a driver. These components may be unique to the navigation system 88 or shared with other systems. For example, in one or more embodiments the navigation system 88 and the guidance system 20 both use a common user interface 26. The navigation system 88 may also communicate distance and/or location information associated with the vehicle 22, its target destinations, or other relevant GPS waypoints.

The vehicle guidance system 20 provides information to the driver regarding the position of the vehicle 22 relative to the external power supply 28, and the charging status. The vehicle controller 56 receives input signals that are indicative of current operating conditions of the vehicle 22. For instance, the vehicle controller 56 may receive input signals from the BECM 52, the transmission 54 (e.g., motor 36 and/or inverter 48), the climate control system 62, the driver controls system 84, the power steering system 86, or the like. The vehicle controller 56 provides output to the controller 24 such that the user interface 26 conveys vehicle position information, charging status or other information relating to the operation of the vehicle 22 to a driver.

Figure 3:
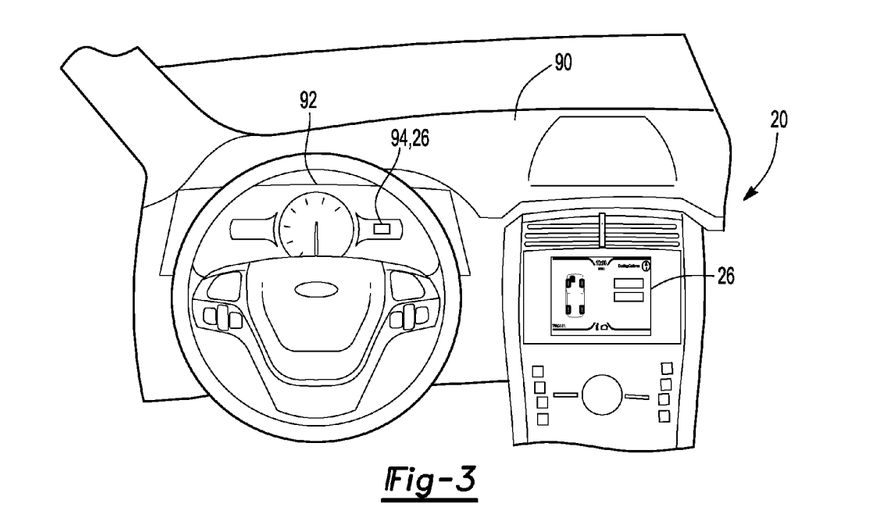
FIG. 3 is a front perspective view of a user interface of the vehicle guidance system of FIG. 1.

Referring to FIG. 3, the user interface 26 conveys information, such as vehicle position and charging status, to the driver. The user interface 26 is located in a central portion of a dashboard 90 ("centerstack") according to one or more embodiments. Moreover, the user interface 26 may be part of another display system, such as the navigation system 88, or may be part of a dedicated guidance system 20. The user interface 26 may be a liquid crystal display (LCD), a plasma display, an organic light emitting display (OLED), or any other suitable display. The user interface 26 may include a touch screen or one or more buttons (not shown), including hard keys or soft keys, located adjacent the user interface 26 for effectuating driver input. Other operator inputs known to one of ordinary skill in the art may also be employed without departing from the scope of the present application. The user interface 26 is located within an instrument panel 92, according to another embodiment. The user interface 26 may be a digital display, or an indicia 94 that is illuminated by an underlying light source in response to signals from the controller 24. Alternatively, the user interface 26 may be an image that is projected in front the driver (not shown).

Figure 4:
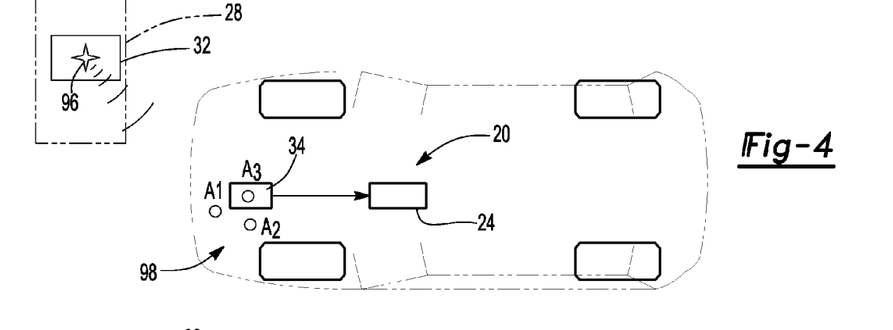
FIG. 4 is another schematic diagram of the vehicle guidance system of FIG. 1, illustrated with the external power supply.

FIG. 4 illustrates a schematic top view of the vehicle guidance system 20 according to at least one embodiment. The guidance system 20 determines the position of the charging port 34 relative to the charging pad 32, and conveys a visual representation of this position to the driver via the user interface 26 (shown in FIG. 3).

The external power supply 28 includes a transmitter, such as a beacon 96, that is coupled to the charging pad 32 for communicating with the guidance system 20. The beacon 96 is configured for transmitting a wireless signal at a predetermined frequency (e.g., between 3 kHz and 300 GHz), in response to instructions received from the external controller 82 (shown in FIG. 2). The wireless signal is represented by spaced apart lines extending from the beacon 96 in FIG. 4. The controller 24 may initiate communication with the external controller 82 for activating the beacon 96. The controller 24 may include a transmitter (not shown) which transmits an activation signal to a receiver (not shown) of the external controller 82. Upon receipt of the activation signal, the external controller 82 will "wake up", if the external controller 82 is presently in a "sleep" mode, by energizing appropriate circuitry. The external controller 82 activates the beacon 96 to begin transmitting. In one embodiment, the external controller 82 activates the beacon 96 in response to a garage door (not shown) being opened. In such an embodiment, a door sensor (not shown) may provide an input signal to the external controller 82 that is indicative of a garage door position. Alternate embodiments of the guidance system contemplate that the external controller 82 may activate, or "wake up" in response to receiving input signals from another external device (such as a garage door opener); or that the beacon 96 transmits constantly and therefore does not need to "wake up".

Figures 5, 6, 7:
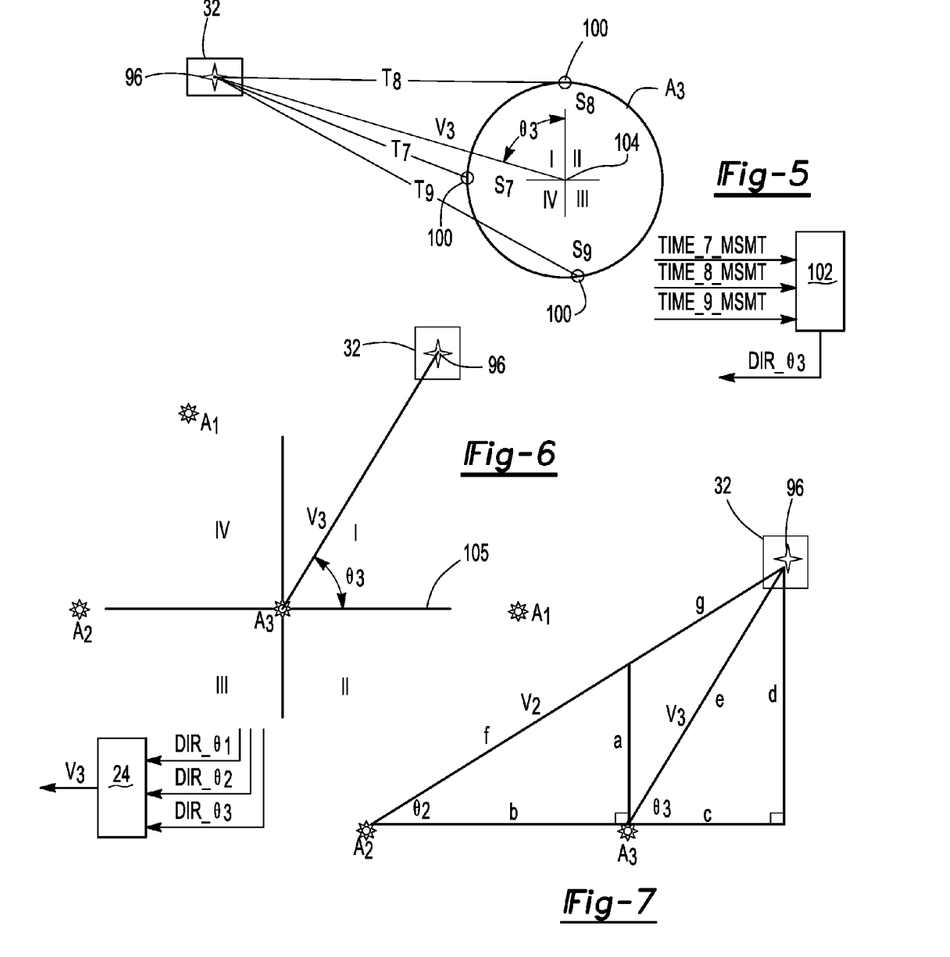
FIG. 5 is a partial view of the vehicle guidance system of FIG. 4, illustrated with an enlarged sensor array and a central axis.
FIG. 6 is a partial view of the vehicle guidance system of FIG. 4, illustrated rotated about the central axis.
FIG. 7 is a diagram further illustrating the vehicle guidance system of FIG. 6.

Referring to FIGS. 4 and 5, the vehicle 22 includes a plurality of sensor arrays 98 for receiving the wireless signal from the beacon 96. The sensor arrays 98 are each secured proximate to the charging port 34. The sensor arrays 98 are secured in different locations depending on the type of wireless signals received. For example, in one embodiment the sensor arrays 98 are configured for receiving an RF signal, and therefore may be secured internally or within a protective housing (not shown). In other embodiments, the sensor arrays 98 are configured for IR communication, and therefore are externally mounted for receiving an IR signal along a line-of-sight.

In the illustrated embodiment, the vehicle 22 includes three sensor arrays 98, which are generally referenced as: A1, A2 and A3. Each sensor array 98 includes three sensors 100, according to one or more embodiments. For example, sensor array A1 includes sensors: S1, S2, and S3 (not shown); sensor array A2 includes sensors: S4, S5, and S6 (not shown); and sensor array A3 includes sensors S7, S8, and S9 (shown in FIG. 5). Each sensor array 98 includes a microcontroller 102 for communicating with the sensors of the corresponding array 98. Each sensor 100 transmits a time measurement signal (TIME_N_MSMT) to the corresponding microcontroller 102 that is indicative of the time at which the individual sensor 100 received the wireless signal from the beacon 96. The TIME_N_MSMT signal is an analog signal according to one embodiment. Other embodiments contemplate a single microcontroller 102 for communicating with all of the sensor arrays 98.

FIG. 5 depicts an enlarged view of sensor array A3, oriented relative to charging pad 32. Each sensor 100 of an array 98 is equally spaced from each of the other sensors 100 within the array 98. For example, FIG. 5 depicts sensor array A3 as having three sensors (S7, S8, and S9) which are each equally spaced at one hundred-twenty degree intervals from each other about a central axis 104. A coordinate system having four ninety degree quadrants (I, II, III, and IV) is illustrated about the central axis 104.

Each microcontroller 102 determines the angular direction (A) of the beacon 96 relative to the corresponding sensor array 98. First the microcontroller converts the analog TIME_N_MSMT signals into digital data (Tn). The microcontroller 102 includes signal conditioning equipment (not shown) for modifying any such received signals for analysis. The data values (Tn) correspond to the distance between each sensor 100 and the beacon 96. As illustrated in FIG. 5, data value T7 corresponds to the distance between sensor S7 and the beacon 96; data value T8 corresponds to the distance between sensor S8 and the beacon 96; and data value T9 corresponds to the distance between sensor S9 and the beacon 96. The microcontroller 102 then compares the data value of the time signals (Tn) to each other to determine which Quadrant the charging pad 32 is located in, relative to the charging port 34 and to select a trigonometric equation from predetermined data for calculating the angular direction ($\theta$).

For example, sensor S7 is oriented closest to the charging pad 32 in FIG. 5, and therefore S7 receives the wireless signal from the beacon 96 before sensors S8 and S9. Sensor S8 is located closer to the charging pad 32 than sensor S9. Therefore, the microcontroller 102 would assign a data value for T8 that is less than data value T9. The microcontroller 102 compares data values T7, T8 and T9 to predetermined data. Since T7 equals zero, and T8 is less than T9, the microcontroller 102 determines that the charging pad 32 is located in quadrant I relative to the charging port 34.

The microcontroller 102 determines an angular direction ($\theta 3$) between sensor array A3 and the charging pad 32 by comparing the data value for the second (T8) and third (T9) received time signals. As illustrated in FIG. 6, the angular direction ($\theta$) is measured from a transverse axis 105 that extends through the centers of sensor arrays A2 and A3. The angular direction ($\theta$) between sensor array A1 and the charging pad 32, is measured relative to an axis (not shown) that is parallel to the transverse axis 105. Equation 1 shown below provides an equation for calculating the angular direction ($\theta 3$) when the charging pad 32 is located in Quadrant I:

$$\theta_3 = \sin^{-1}[k*(T8+T9)] \qquad \text{Eq. 1}$$

Equation 2 shown below represents a constant value (K) that is dependent on the placement of the sensors 100 about a circle having a radius (R) and the speed of light (c):

$$k = 0.5 * \frac{c}{R} \qquad \text{Eq. 2}$$

In one or more embodiments, the microcontroller 102 is configured with predetermined data, or a "look-up" table for the angular direction values ($\theta n$). The predetermined data includes pre-calculated values for the angular direction corresponding to various time data values (Tn) for each of the four Quadrants (I, II, III, and IV). Thus after the guidance system 20 determines which Quadrant the charging pad 32 is located in; the microcontroller 102 compares the time values to predetermined data (look-up tables) to determine the angular direction.

FIGS. 6 and 7 depict schematic views of the sensor arrays of the vehicle guidance system 20, that are rotated approximately ninety degrees clockwise about central axis 104 when compared to FIG. 5. One of the sensor arrays (A3) may be disposed at the center of the charging port 34. The beacon 96 is disposed at the center of the charging pad 32, and generally referenced by a star. By aligning the centers of the charging port 34 and charging pad 32 to each other, there is a greater allowable tolerance between the two systems. Each sensor array: A1, A2 and A3 includes a microcontroller (shown in FIG. 5) which transmits a corresponding angular direction signal DIR_θ1, DIR_θ2, and DIR_θ3, to the controller 24. Additionally, each sensor array 98 is equally spaced from each of the other sensor arrays 98, by a fixed distance or "baseline", which is generally referenced by letter "b" in FIG. 7.

The guidance system 20 utilizes the principles of triangulation to determine the instantaneous position of the charging port 34 relative to the charging pad 32, according to one or more embodiments. Triangulation is the process of determining the location of a point by measuring angles to it from known points at either end of a fixed baseline, rather than measuring distances to the point directly (trilateration). The point can then be fixed as the third point of a triangle with one known side and two known angles.

The controller 24 determines the distance (e) between the center of the charging pad 32 (beacon 96) and the central axis 104 of the charging port 34, using the angular direction values (θ2 and θ3) from known points (A2 and A3) at either end of a fixed baseline (b). Since (θ2), (θ3), and distance (b) are known values, the controller 24 calculates distance (e) using trigonometry equations.

Equations 3 and 4 shown below provide equations for calculating distance (a) in FIG. 7 with respect to triangle (f,a,b), using a known value for distance (b), and an angular direction (θ2) that was calculated per Equation 1:

$$\tan\theta_2 = \frac{a}{b} \qquad \text{Eq. 3}$$

$$a = b * \tan\theta_2 \qquad \text{Eq. 4}$$

Equation 5 shown below provides an equation for calculating tan(θ2) in FIG. 7, with respect to triangle (f+g, d, b+c):

$$\tan\theta_2 = \frac{d}{b+c} \qquad \text{Eq. 5}$$

Equations 6 and 7 shown below provide equations for calculating distance (d) in FIG. 7, by combining Equations 3 and 5:

$$\frac{a}{b} = \frac{d}{b+c} \qquad \text{Eq. 6}$$

$$d = \frac{a(b+c)}{b} \qquad \text{Eq. 7}$$

Equations 8 and 9 shown below provide an equation for calculating distance (c) in FIG. 7, with respect to triangle (e, d, c):

$$\tan\theta_3 = \frac{d}{c} \qquad \text{Eq. 8}$$

$$c = \frac{d}{\tan\theta_3} \qquad \text{Eq. 9}$$

Equations 10 and 11 shown below provide an equation for calculating distance (e) in FIG. 7, with respect to triangle (e, d, c):

$$\cos\theta_3 = \frac{c}{e} \qquad \text{Eq. 10}$$

$$e = \frac{c}{\cos\theta_3} \qquad \text{Eq. 11}$$

Equations 12-15 shown below illustrate the steps substituting (d) from Equation 7 into Equation 9 to form an equation for calculating distance (c) in terms of distances (a) and (b) and angular direction (θ3):

$$c = \frac{\frac{a(b+c)}{b}}{\tan\theta_3} \qquad \text{Eq. 12}$$

$$c = \frac{a}{\tan\theta_3} + \frac{a*c}{b*\tan\theta_3} \qquad \text{Eq. 13}$$

$$c\left(1 - \frac{a}{b*\tan\theta_3}\right) = \frac{a}{\tan\theta_3} \qquad \text{Eq. 14}$$

$$c = \frac{\frac{a}{\tan\theta_3}}{1 - \frac{a}{b*\tan\theta_3}} \qquad \text{Eq. 15}$$

Equation 16 shown below illustrates the step substituting (a) from Equation 4 into Equation 15 to form an equation for calculating distance (c) in terms of distance (b) and angular directions (θ2) and (θ3):

$$c = \frac{\frac{b*\tan\theta_2}{\tan\theta_3}}{1 - \frac{b*\tan\theta_2}{b*\tan\theta_3}} \qquad \text{Eq. 16}$$

Equation 17 shown below provides an equation for calculating distance (e) in terms of distance (b) and angular direction values (θ2) and (θ3) by substituting (c) from Equation 16 into Equation 11:

$$e = \frac{\frac{\frac{b*\tan\theta_2}{\tan\theta_3}}{1 - \frac{b*\tan\theta_2}{b*\tan\theta_3}}}{\cos\theta_3} \qquad \text{Eq. 17}$$

The distance vector (V3) includes the distance value (e) and the angular direction (θ3) between the charging port 34 and the charging pad 32. The guidance system 20 calculates the angular direction (θ3) using Equation 1, and the distance (e) using Equation 17. Equations 1-17 are applicable when the distance vector is located in Quadrant I, (when the beacon 96 is closer to A1, than A2 or A3, and (θ2) is less than (θ3)). However, a similar approach using trigonometric equations may be applied when the distance vector is located in another Quadrant.

For example, in one embodiment the controller 24 receives input signals: DIR_θ1, which indicates that angular direction (θ1) equals 49.8 deg; DIR_θ2, which indicates that angular direction (θ2) equals 55.55 deg; and DIR_θ3, which indicates that angular direction (θ3) equals 60 deg. The controller 24 calculates distance (e) to be 5.35 m, using Equation 17 and substituting a value for (b) of 1.0 m, a value for (θ2) of 55.55 deg, and a value for (θ3) of 60 deg.

In one or more embodiments, the controller 24 is configured with predetermined data, or a "look-up" table, for the distance vector. The predetermined data includes pre-calculated values for the distance value corresponding to various angular direction values, and distance (b) for each of the four Quadrants (I, II, III, and IV). Thus after the guidance system 20 determines which Quadrant the charging pad 32 is located in, and the angular directions (θ1, θ2, and θ3); the controller 24 compares the angular direction values, and distance (b) to predetermined data (look-up tables) to determine the distance value.

With reference to FIGS. 4-8, a method for determining the instantaneous position of a charging port 34 relative to the charging pad 32 is illustrated in accordance with one or more embodiments and is generally referenced by numeral 110. In operation 112, the controller 24 transmits the activation signal (WAKE_UP) to the external controller 82. Upon receipt of the WAKE_UP signal, the external controller 82 instructs the beacon 96 to begin transmitting the wireless signal (PULSE).

Figure 8:
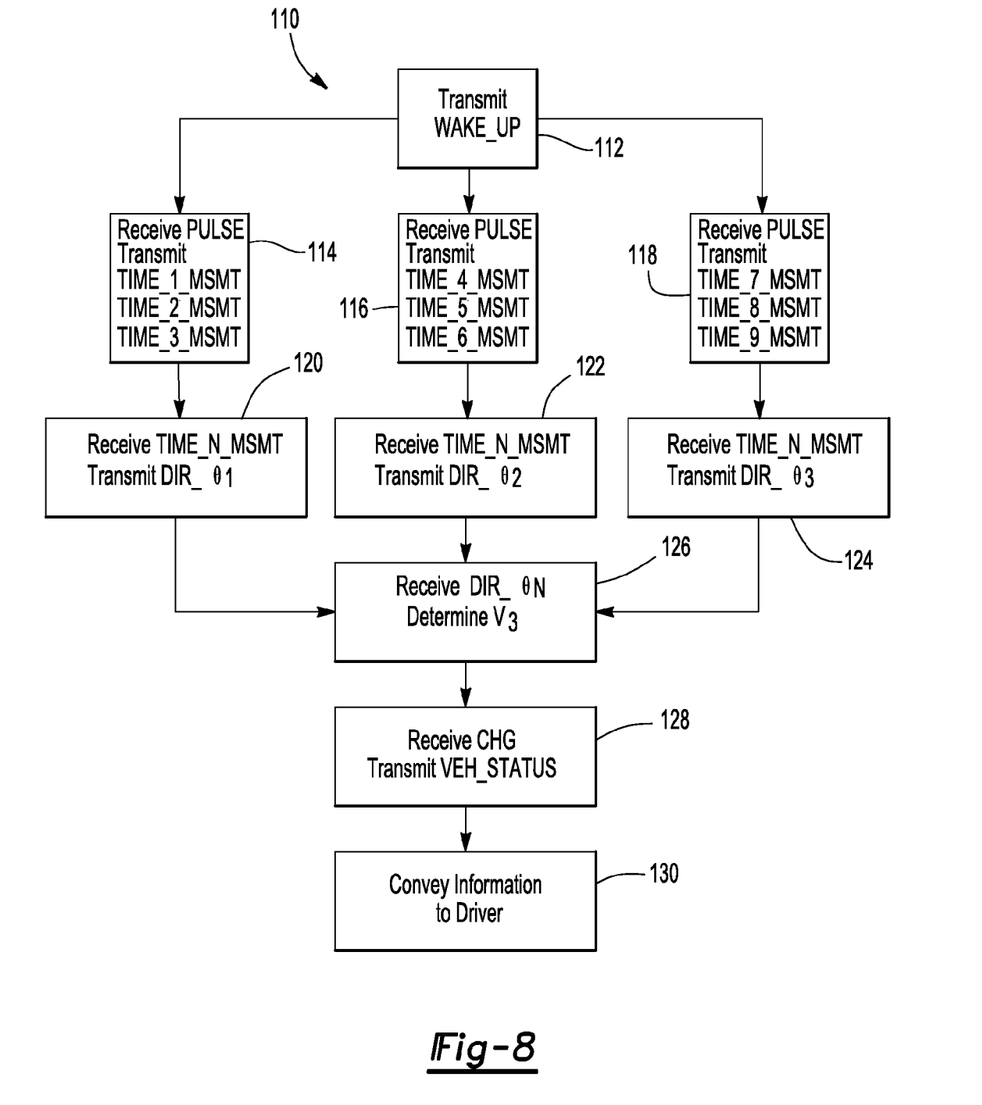
FIG. 8 is a flow chart illustrating a method for determining vehicle position relative to an external power supply according to one or more embodiments.

In operations 114, 116, and 118, each sensor 100 of a sensor array 98 receives the PULSE signal and transmits a corresponding TIME_N_MSMT signal to the microcontroller 102, that is indicative of the time at which the sensor 100 received the PULSE signal.

For example, in operation 114, each sensor (S1, S2, and S3) of array A1 receives the PULSE signal and transmits a TIME_N_MSMT signal (TIME_1_MSMT, TIME_2_MSMT, and TIME_3_MSMT) to the microcontroller 102 of A1 that is indicative of the time at which the sensor 100 received the PULSE signal. In operation 116, each sensor (S4, S5, and S6) of array A2 receives the PULSE signal and transmits a TIME_N_MSMT signal (TIME_4_MSMT, TIME_5_MSMT, and TIME_6_MSMT) to the microcontroller 102 of A2 that is indicative of the time at which the sensor 100 received the PULSE signal. In operation 118, each sensor (S7, S8, and S9) of array A3 receives the PULSE signal and transmits a TIME_N_MSMT signal (TIME_7_MSMT, TIME_8_MSMT, and TIME_9_MSMT) to the microcontroller 102 of A3 that is indicative of the time at which the sensor 100 received the PULSE signal.

In operations 120, 122, and 124, each microcontroller 102 receives digitizes the TIME_N_MSMT signals, and transmits an angular direction signal (DIR_θn). The microcontroller 102 then assigns a data value for each subsequently received time signal based on the time delay between the signals. The microcontroller 102 then compares the data value of the time signals to each other to determine which Quadrant the charging pad 32 is located in and to select a trigonometric equation for calculating the angular direction (θn), from predetermined data. Next, the microcontroller 102 calculates the angular direction value (θn) and transmits a corresponding angular direction signal (DIR_θn) to the controller 24.

For example, in operation 120, the microcontroller 102 of A1 receives input signals TIME_1_MSMT, TIME_2_MSMT, and TIME_3_MSMT to form data values T1, T2, and T3. Then the microcontroller 102 compares T1, T2 and T3 to each other to select an equation for calculating θ1 from predetermined data. Next the microcontroller 102 calculates θ1 and transmits corresponding signal DIR θ1 to the controller 24. In operation 122, the microcontroller 102 of A2 receives input signals TIME_4_MSMT, TIME_5_MSMT, and TIME_6_MSMT to form data values T4, T5, and T6. Then the microcontroller 102 compares T4, T5 and T6 to each other to select an equation for calculating θ2 from predetermined data. Next the microcontroller 102 calculates θ2 and transmits corresponding signal DIR_θ2 to the controller 24. In operation 124, the microcontroller 102 of A3 receives and digitizes input signals TIME_7_MSMT, TIME_8_MSMT, and TIME_9_MSMT to form data values T7, T8, and T9. Then the microcontroller 102 compares T7, T8 and T9 to each other to select an equation for calculating θ3 from predetermined data. Next the microcontroller 102 calculates θ3 and transmits corresponding signal DIR_θ3 to the controller 24.

In operation 126, the controller 24 receives input signals DIR_1, DIR_2, and DIR_3 which correspond to angles θ1, θ2, and θ3 respectively. The controller 24 then calculates the distance (e) between the charging pad 32 and the charging port 34, using the angular direction values (θn) from known points at either end of a fixed baseline (b). The controller 24 then determines the distance vector (V3) by combining the distance (e) and angular direction (θ3).

In one or more embodiments, the vehicle guidance system 20 includes additional operations for analyzing the charging status of the vehicle 22. In operation 128, the controller 24 receives an input signal CHG from another vehicle controller that is indicative of the current charging status of the vehicle 22 (e.g., whether the vehicle 22 is currently charging or not). Next, the controller 24 transmits output, such as a vehicle status signal (VEH_STATUS) to the user interface 26 that is indicative of both the distance vector (V3) and current charging status (CHG). In operation 130, the user interface 26 receives the VEH_STATUS and conveys the information to the driver.

Figure 9:
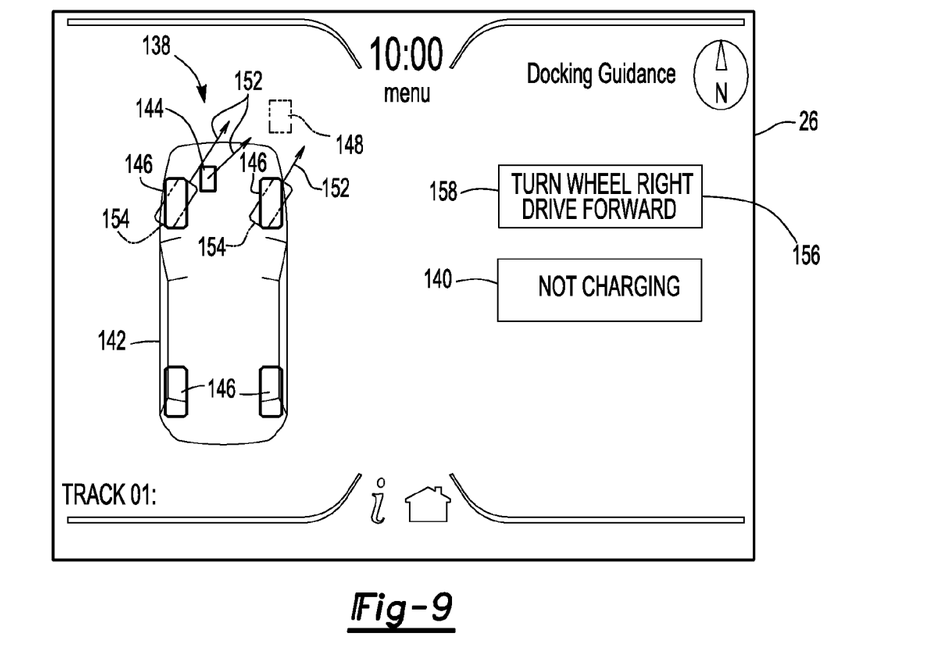
FIG. 9 is an enlarged view of the user interface of FIG. 3 according to one or more embodiments and illustrating a non-aligned vehicle position.
Figure 10:
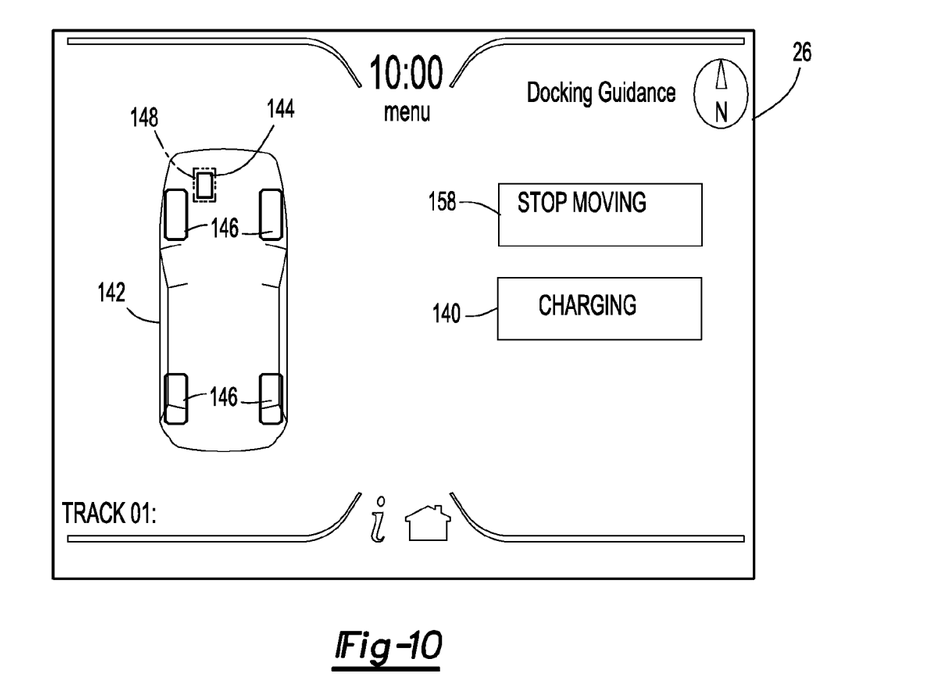
FIG. 10 is another enlarged view of the user interface of FIG. 3, illustrating an aligned vehicle position.

With reference to FIGS. 1, 9, and 10, the charging port 34 and charging pad 32 must be generally close in proximity to each other for efficient inductive charging. Since the charging port 34 is not visible from the driver's seat, it is difficult for the driver to align the charging port 34 to the charging pad 32, without a guide or some type of feedback. Therefore, the user interface 26 conveys vehicle position information to the user so that the user can align the charging port 34 to the charging pad 32, without having to see either component.

FIG. 9 depicts the vehicle 22 in a non-aligned position, as the vehicle 22 approaches the charging pad 32. FIG. 10 depicts the vehicle 22 as being aligned with the charging pad 32, and receiving electrical power from the external power supply 28 (charging).

The user interface 26 receives the vehicle status signal from the controller 24 and displays a vehicle position indicator 138 and a charging status message 140. The driver uses this information as a guide to align the vehicle 22 relative to the external power supply 28. The user interface 26 is configured to display active images that adjust in real time in response to the vehicle status signal.

The vehicle position indicator 138 includes elements that represent instantaneous positions, which are illustrated with solid lines in FIGS. 9 and 10. The term "instantaneous" as used in the disclosure is a relative term because it is understood that there is some delay due to signal processing and transmission. The vehicle position indicator 138 includes a vehicle diagram 142 with a charging port element 144. The vehicle diagram 142 depicts an external outline of the vehicle 22; and represents an instantaneous vehicle position. The charging port element 144 represents an instantaneous charging port position. The vehicle position indicator 138 also includes four wheel elements 146, according to one or more embodiments. Each wheel element 146 represents an instantaneous wheel position.

The vehicle position indicator 138 also includes elements that represent target positions, which are illustrated with phantom lines in FIGS. 9 and 10. The vehicle position indicator 138 includes a target element 148 that represents a target charging port position. The target element 148 is indicative of a charging pad position, according to one or more embodiments. Inductive charging of the vehicle battery is available when the charging port element 144 is aligned with the target element 148, or charging pad 32. Other embodiments of the vehicle position indicator 138 include target wheel elements and target vehicle diagrams (not shown) that represent corresponding target positions.

The user interface 26 is configured to display the charging status message 140 in response to the vehicle status signal. The charging status message 140 indicates whether or not the vehicle is presently charging. The charging status message 140 is conveyed as text within a text box in the illustrated embodiment. Other embodiments of the user interface 26 contemplate a pictorial or audible charging status message.

The user interface 26 is further configured to display a steering instruction in response to the vehicle status signal, according to one or more embodiments. The steering instruction informs the driver as to which way to turn the steering wheel (shown in FIG. 3) to align the charging port 34 with the charging pad 32.

The steering instruction is conveyed visually, as a pictorial element in the vehicle position indicator 138, in one or more embodiments. In the illustrated embodiment, the steering instruction includes an arrow 152 extending from one or more of the elements toward a corresponding target element. For example, an arrow 152 extends from the charging port element 144 toward the target element 148. The arrow(s) 152 may also extend from an element, such as the front wheel elements 146, in the general direction of where that element must move to align the charging port 34 to the charging pad 32, as illustrated in FIG. 9. Other embodiments of the steering instruction contemplate target wheel elements 154 (shown in FIG. 9) being disposed over a corresponding wheel element 146 and rotated toward a target wheel position.

The steering instruction is conveyed visually, as text, in one or more embodiments. In the illustrated embodiment, a steering instruction message 156 is displayed within a text box and adjacent to the charging status message 140 on the user interface 26.

The user interface 26 is further configured to display a propulsion instruction 158 that is conveyed to a driver in response to the vehicle status signal, according to one or more embodiments. The propulsion instruction 158 informs the driver as to which direction to drive (e.g., "Drive Forward", as shown in FIG. 9), and when to stop driving (e.g., "Stop Moving" as shown in FIG. 10). Other embodiments of the guidance system 20 include speakers (not shown) for conveying the steering instruction and/or the propulsion instruction to the driver audibly.

With reference to FIGS. 2, 9, and 10, one or more embodiments of the guidance system 20 are configured for vehicles 22 having a park assist feature. For such vehicles, the driver controls the propulsion of the vehicle 22 via the driver control systems 84, and vehicle controllers control the steering of the vehicle 22 using the power steering system 86, for aligning the charging port 34 to the charging pad 32. The power steering system 86 receives the VEH_STATUS signal, or another signal indicative of the distance vector between the charging port 34 and charging pad 32, and controls the steering of the vehicle 22 accordingly.

Figure 11:
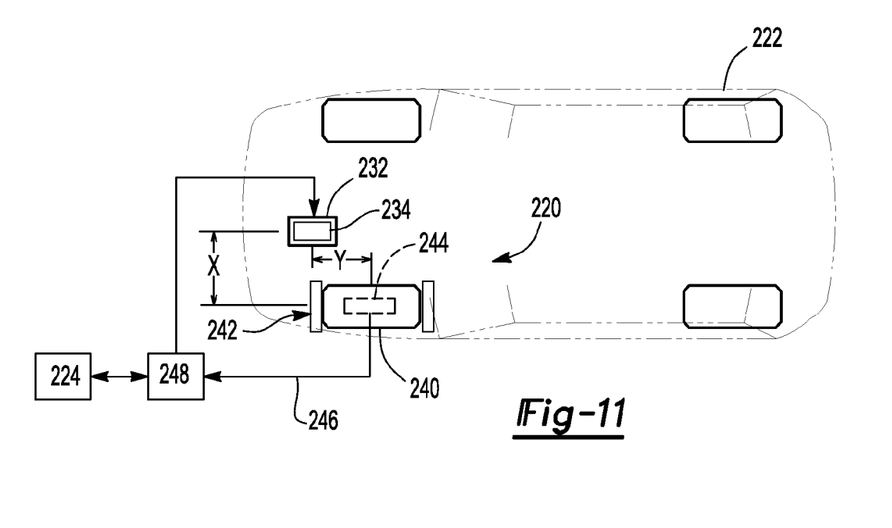
FIG. 11 is a schematic diagram of a vehicle guidance system according to another embodiment.

With reference to FIGS. 3 and 11, a simplified vehicle guidance system is illustrated in accordance with another embodiment and is generally referenced by numeral 220. The guidance system 220 is depicted within a vehicle 222. The guidance system 220 includes a controller 224 and a user interface, such as indicia 94 (shown in FIG. 3). The vehicle 222 is configured for inductive charging, and receiving electrical power from a charging pad 232 connected to an external power supply (not shown).

The vehicle 222 includes a charging port 234 that is aligned with the charging pad 232 for receiving electrical power. The charging port 234 is located at a defined lateral distance ("X"), and longitudinal distance ("Y") away from a reference wheel 240 of the vehicle 222. The charging pad 232 is located at a defined lateral distance and longitudinal distance away from a wheel fixture 242, that is equal to the lateral distance (X) and longitudinal distance (Y) between the charging port 234 and the wheel 240. Thus aligning the wheel 240 to the wheel fixture 242 will also align the charging port 234 to the charging pad 232. In one embodiment, the wheel fixture 242 includes a wheel chock for engaging opposing sides of the wheel 240.

A wheel sensor 244 is disposed proximate the wheel fixture 242, and provides a wheel position signal 246, that is indicative of the presence of the reference wheel 240, according to one embodiment. The wheel sensor 244 may be a load sensor or a proximity switch, or other suitable sensor. An external controller 248 communicates with the charging pad 232 and the wheel sensor 244. The external controller 248 instructs the charging pad 232 to provide electrical power to the charging port 234 in response to the wheel signal 246. The charging pad 232 may be coupled to an actuator (not shown) to move relative to the charging port 34. The external controller 248 may also control the actuator in response to the wheel signal 246. The controller 224 may communicate with the external controller 248 for receiving input signals that are indicative of the vehicle position and charging status.

The user interface, or indicia 94 (shown in FIG. 3) communicates with the controller 224 and is configured to display a vehicle position indicator and a charging status message in response to the vehicle status signal. In one embodiment, the indicia 94 is illuminated when both the wheel 240 is secured in the wheel fixture 242, and the vehicle is charging.

Figure 12:
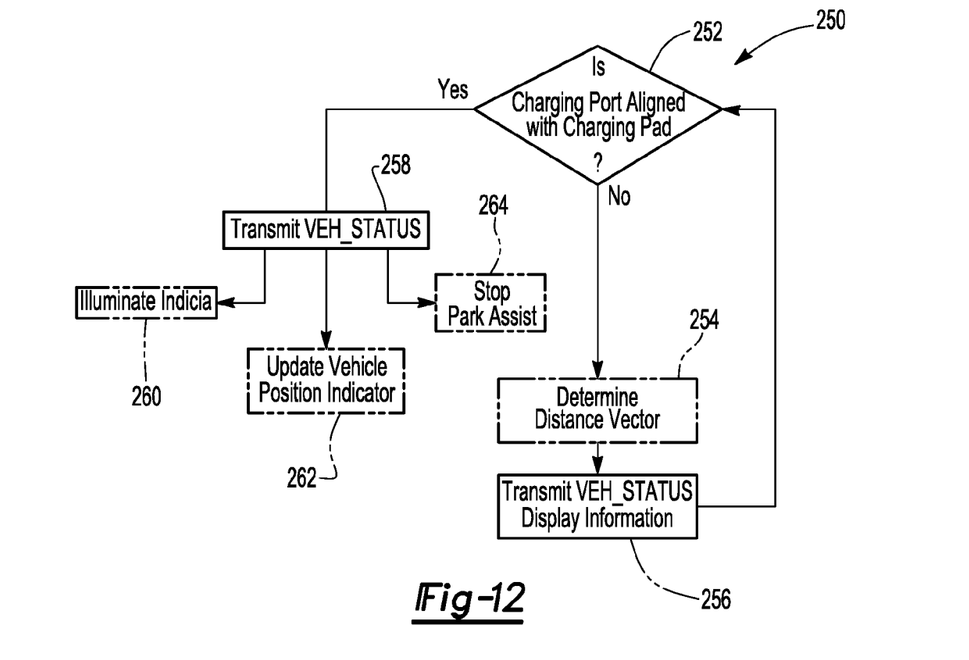
FIG. 12 is a flow chart illustrating a method for conveying vehicle distance status and charging status to a user according to one or more embodiments.

Referring to FIG. 12, a method for conveying vehicle status information to a driver for aligning a vehicle to an external power supply, is illustrated in accordance with one or more embodiments and is generally referenced by numeral 250. With reference to FIGS. 1, 11, and 12; in operation 252, the controller 24, 224 determines if the charging port 34 is aligned with the charging pad 32. In one or more embodiments, the controller 24 analyzes the distance vector (V3) to determine this alignment. When the distance vector (V3) equals zero, the controller determines that YES the charging port 34 is aligned with the charging pad 32. In another embodiment, the controller 224 receives a wheel position signal 246 from the external controller 248 that indicates that the reference wheel 240 is aligned with the wheel fixture 242. When the reference wheel 240 is aligned with the wheel fixture 242, the controller 224 determines that YES, the charging port 234 is aligned with the charging pad 232.

In operation 254, after the controller 24 has determined that NO, the charging port 34 is not aligned with the charging pad 32, the controller determines the distance vector (V3). In one or more embodiments the controller 24 determines the distance vector (V3) using operations 114-126 of method 110. In a simplified vehicle guidance system 220, the controller 224 waits for an updated wheel position signal 246.

In operation 256, after the controller 24, 224 has determined that NO, the charging port 34 is not aligned with the charging pad 32, the controller 24, 224 transmits an updated vehicle status signal (VEH_STATUS) to the user interface 26 or indicia 94. The user interface 26 adjusts the information conveyed to the user (e.g., vehicle position indicator, steering or propulsion instructions, and illumination) in response to the VEH_STATUS signal. After operation 256, the controller 24, 224 returns to operation 252.

In operation 258, after the controller 24, 224 has determined that YES, the charging port 34 is aligned with the charging pad 32; the controller 24, 224 transmits an updated vehicle status signal (VEH_STATUS) to the user interface 26 or indicia 94. In operation 260, according to one embodiment, the controller 224 illuminates the indicia 94 after determining alignment is made (see FIG. 3). In operation 262, according to another embodiment, the controller 24 illustrates a charging port element 144 overlaid upon a target element 148 after determining alignment is made (see FIG. 10). In operation 264, according to yet another embodiment of the vehicle guidance system 20 that coordinates with a vehicle park-assist feature; the controller 24 transmits the VEH_STATUS signal to the power steering system 86, which ceases making steering adjustments when alignment is made.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle guidance system comprising:
a controller configured to receive input signals indicative of an instantaneous vehicle position relative to an external charging pad and a charging status, and transmit a vehicle status signal in response to the input signals; and
an interface communicating with the controller and configured to display a vehicle position indicator and a charging status message in response to the vehicle status signal;
wherein the vehicle position indicator comprises:
a vehicle diagram with a charging port element indicative of the instantaneous charging port position, and
a target element indicative of a target charging port position, wherein vehicle charging is available when the charging port element is aligned with the target element.

2. The vehicle guidance system of claim 1 wherein the target element is indicative of a charging pad position.

3. The vehicle guidance system of claim 1 wherein the vehicle position indicator further comprises at least one wheel element indicative of an instantaneous front wheel position.

4. The vehicle guidance system of claim 3 wherein the interface is further configured to display a steering instruction that is conveyed to a user in response to the vehicle status signal.

5. The vehicle guidance system of claim 4 wherein the steering instruction comprises an arrow extending from the wheel element toward a target wheel position.

6. The vehicle guidance system of claim 4 wherein the steering instruction comprises a target wheel element disposed over the wheel element and rotated toward a target wheel position.

7. The vehicle guidance system of claim 1 wherein the interface is further configured to display at least one of a steering instruction and a propulsion instruction that is conveyed to a user in response to the vehicle status signal.

8. The vehicle guidance system of claim 7 wherein the steering instruction and the propulsion instruction are each conveyed visually to the user by illuminating a text box within the interface.

9. The vehicle guidance system of claim 7 wherein the steering instruction and the propulsion instruction are each conveyed audibly to the user through a speaker.

10. The vehicle guidance system of claim 1 wherein the interface comprises an indicia adapted to be illuminated in response to the vehicle status signal.

11. A vehicle comprising: a charging port; a controller configured to receive input signals indicative of an instantaneous charging port position relative to an external charging pad and a charging status, and transmit a vehicle status signal in response to the input signals; and
an interface communicating with the controller and configured to display vehicle position indicator with a vehicle diagram having a charging port element indicative of the instantaneous charging port position and a charging status message in response to the vehicle status signal; wherein the charging port is spaced apart from the vehicle wheel at a predetermined distance corresponding to a distance between the external charging pad and a wheel fixtures, and wherein the charging port aligns with the external charging pad by aligning the vehicle wheel with the wheel fixture.

12. The vehicle of claim 11 further comprising a charging sensor communicating with the controller for monitoring electrical energy received by the charging port and providing a charging signal indicative of the charging status.

13. The vehicle of claim 11 further comprising a wheel sensor in communication with the controller for providing a wheel signal indicative of a vehicle wheel position relative to the wheel fixture.

14. The vehicle of claim 11 further comprising a dash, wherein the interface is disposed at a central portion of the dash.

15. The vehicle of claim 11 wherein the charging port comprises a secondary coil for receiving electrical energy from a primary coil of the external charging pad during charging.

16. The vehicle of claim 11 further comprising a power steering system in communication with the controller, the power steering system being coupled to at least two vehicle wheels for adjusting a steering angle of the vehicle wheels in response to the vehicle status signal.

17. The vehicle of claim 11 further comprising:
an electric motor; and
a control module in communication with the electric motor and the controller, the control module being configured to adjust an output torque of the electric motor in response to the vehicle status signal.

* * * * *